C. C. SMITH.
LOADING DEVICE FOR AUTOMOBILES
APPLICATION FILED JULY 23, 1918.
1,310,036.
Patented July 15, 1919.
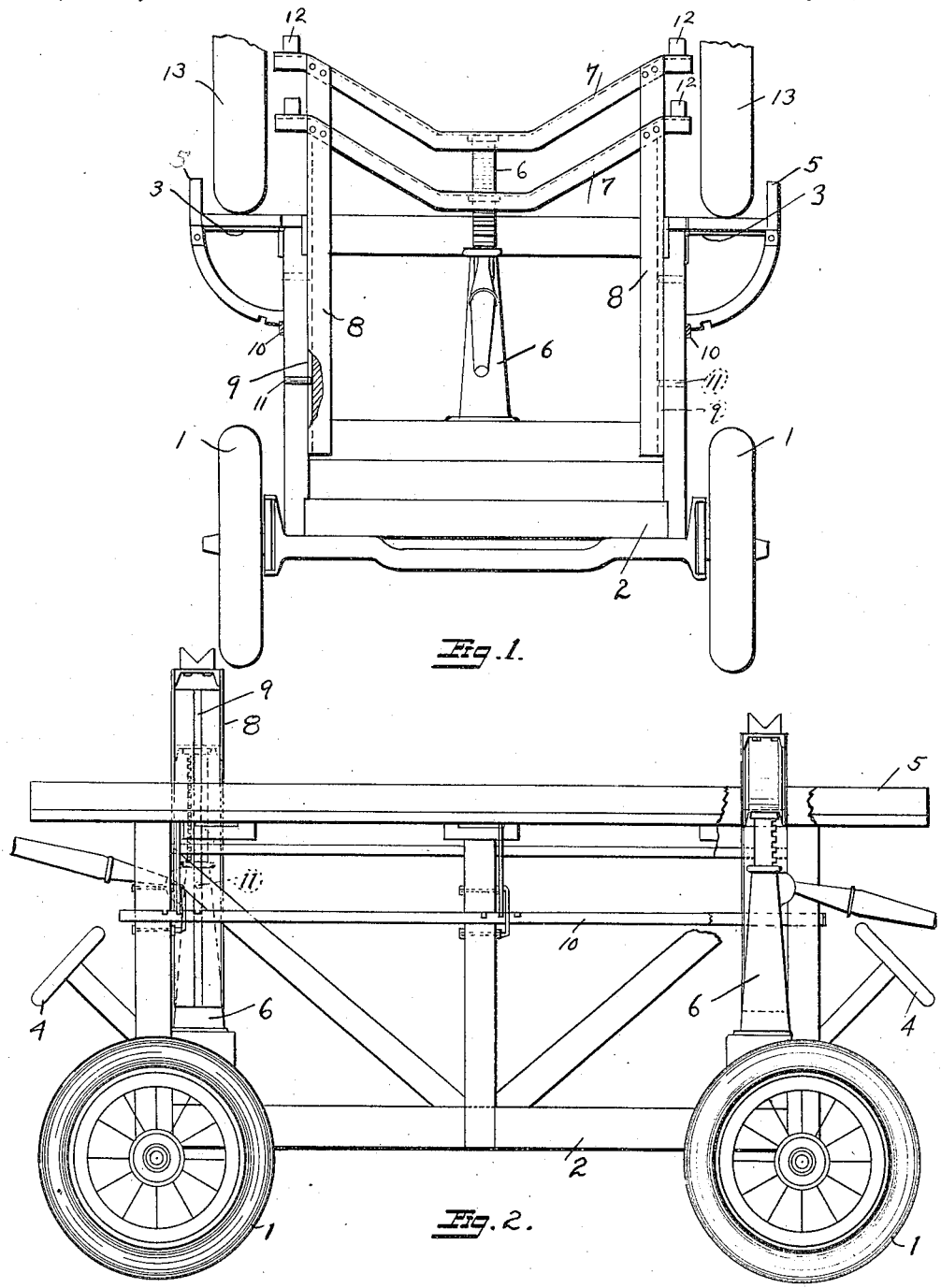
INVENTOR
Carl Clyde Smith
BY E. C. Miles
ATTORNEY

UNITED STATES PATENT OFFICE.

CARL CLYDE SMITH, OF OAKLAND, CALIFORNIA.

LOADING DEVICE FOR AUTOMOBILES.

1,310,036.　　　　Specification of Letters Patent.　　Patented July 15, 1919.

Application filed July 23, 1918. Serial No. 246,384.

*To all whom it may concern:*

Be it known that I, CARL CLYDE SMITH, a citizen of the United States, and a resident of the city of Oakland, in the county of Alameda and State of California, (whose postoffice address is No. 1802 64th avenue,) have invented a new and useful Loading Device for Automobiles, of which the following is a specification.

My invention relates to a device for the easy loading and handling of automobiles, in which a body or frame of suitable dimensions is mounted on trucks, with guiding handles at each end of the frame and attached in a suitable manner to the front and rear axles of the said truck, and the said frame being provided at each side with run ways which are so arranged that they may be folded down along the respective sides of the said frame so as to give more freedom of action in working around the automobile while it is being loaded into a railway car or other conveyance for shipment. These runways have guide rails at their outer edges, and the automobile or other vehicle is run from a platform of suitable height onto these runways.

A former patent has already been allowed to me for a similar device, the application for which was filed May 8th 1918 and was allowed July 10th 1918, and bears Serial No. 233,367. The above description is equally applicable to this application as to the former one, and no claim is being made in this application for the general construction of the frame or the folding runways attached thereto. In my former application my device was equipped with four jacks mounted at each of the four corners of the said frame, and each one of the said jacks had to be manipulated independently of each other; while in this application, only two jacks are used, and they are mounted one at each end of the said frame in the center thereof, and are provided with cross arms rigidly attached to the heads of the said jacks; the outer ends of the said arms being in alinement with the four axles of the said automobile or other vehicle to be loaded. The automobile is raised off of the said runways by the manipulation of the jacks, and the runway may then be folded down for the removal of the wheels or the more convenient adjustment of the machine for shipment. My device is susceptible of many uses in the handling of heavy articles requiring careful handling in loading into railway cars or other conveying vehicles.

The object of my invention is to provide an easy, economical and convenient method of handling heavy articles requiring extreme care, and more particularly automobiles, for the purpose of shipment.

Another object of my invention is to save labor in the handling and loading of automobiles into railway cars.

I attain these objects by the mechanism illustrated in the accompanying drawing, in which:

Figure 1 is an end view of my device, showing the cross arms rigidly attached to the heads or upper ends of the lifting jacks, with parts of the frame broken away to show the essential construction.

Fig. 2 is a side elevation partly in section, to show the guiding tubes for the stabilizing columns.

Similar figures refer to similar parts throughout the several views.

1, are the wheels of the truck on which the device is mounted; 2 is the frame; 3 are the hinges supporting the runway when in use; 4 are the steering handles; 5 are the guide rails on the outer edges of the said runways; 6 are the lifting jacks; 7 are the cross arms. The members 8 are uprights rigidly attached to the part 7 and provided with grooves in their outer faces, which grooves receive the inwardly projecting ends of pins 11, in order to guide the parts 8 in their upward and downward movements. 10 is a sliding bar extending longitudinally along the outside of the said frame, and is fastened thereto by suitable fastenings and stirrups and bolts and is for the purpose of guiding and holding the supporting braces for the said runways; 12 are V shaped pieces of suitable material, preferably of metal, rigidly attached by suitable means, to the top side of the outer ends of the said cross arms, so as to be in alinement with the axles of the automobile or other vehicle being handled, and supply a seat for the said axle, thus holding it in place while being raised by the action of the lifting jacks; 13 are the outlines of the wheels of an automobile showing the same when resting upon the runways.

Having now described my invention, that which I claim to be new and desire to secure by Letters Patent is:

1. A loading device for automobiles and other similar articles of the kind described, having a frame with folding or adjustable runways as shown, a lifting jack mounted on said frame at either end thereof; the said jacks having cross arms rigidly attached in a suitable manner to the upper end of the said jacks, the said arms extending outwardly from the said jacks and parallel with the end of the said frame.

2. A loading device of the kind described, comprising a frame having folding or adjustable runways at the sides thereof, the said frame being mounted on trucks of a suitable kind, a lifting jack disposed on the said frame in the center of each end thereof, the said jacks having cross arms rigidly attached in a suitable manner to the upper ends thereof, the said cross arms extending outwardly from the said jacks and parallel with ends of the said frame, and having on their upper sides near their outer ends, a V shaped piece rigidly attached thereto and in alinement with the outer ends of the respective axles of the automobile when upon the runways; substantially as described.

3. A loading device of the kind described, comprising a frame having folding runways attached to and extending along the outside thereof and parallel therewith; the said frame having a guiding tube perpendicularly disposed and extending downwardly from the top thereof, and attached by suitable bolts as shown, to the inside corners of the said frame; a lifting jack suitably mounted on the said frame in the center of each end thereof, the said lifting jacks being provided with cross arms rigidly attached to the upper ends thereof, the said cross arms extending outwardly from the said jacks and parallel with the end of the said frame, a V shaped piece rigidly attached to the upper side of the said cross arms near the outer ends thereof and so disposed as to be in alinement with outer ends of the axles of the automobile or other vehicle when in position upon the runways, a guiding and stabilizing column rigidly affixed to the said cross arms near the outer ends thereof as shown and in alinement with the said guiding tubes.

4. In combination, a loading device of the kind described, comprising a frame having folding runways attached to and extending along the outer sides thereof and parallel therewith; the said frame having a guiding tube perpendicularly disposed and extending downwardly from the top thereof, and attached to the said frame by suitable bolts as shown, to the inside corners of the said frame; a lifting jack suitably mounted on the said frame in the center of each end thereof, the said lifting jacks being provided with cross arms rigidly attached to the upper ends thereof and extending outwardly from the said jacks and parallel with the ends of the said frame; a V shaped piece rigidly attached to the upper side of the said cross arms near the outer ends thereof, and so disposed as to be in alinement with the outer ends of the axles of the automobile or other vehicle when in position upon the runways; a guiding and stabilizing column rigidly attached to the said cross arms near the outer ends thereof and in alinement with the said guiding tubes, all substantially as shown.

CARL CLYDE SMITH.

Copies of this patent may be obtained for five cents each, by addressing the "Commissioner of Patents. Washington, D. C."